(12) United States Patent
Sarkar et al.

(10) Patent No.: US 6,824,907 B2
(45) Date of Patent: Nov. 30, 2004

(54) TUBULAR SOLID OXIDE FUEL CELL STACK

(75) Inventors: Partho Sarkar, Edmonton (CA); Hongsang Rho, Edmonton (CA)

(73) Assignee: Alberta Reasearch Council, Inc., Edmonton (CA)

( * ) Notice: Subject to any disclaimer, the term of this patent is extended or adjusted under 35 U.S.C. 154(b) by 196 days.

(21) Appl. No.: 10/078,548

(22) Filed: Feb. 14, 2002

(65) Prior Publication Data

US 2003/0134169 A1 Jul. 17, 2003

Related U.S. Application Data

(63) Continuation-in-part of application No. 10/053,241, filed on Jan. 16, 2002.

(51) Int. Cl.[7] .......................... H01M 8/12; C04B 35/64; B01D 53/22
(52) U.S. Cl. ........................ 429/31; 429/32; 264/618; 264/619; 96/10
(58) Field of Search .................. 429/31, 32; 264/614, 264/618, 619; 210/321.87; 96/10

(56) References Cited

U.S. PATENT DOCUMENTS

| | | | |
|---|---|---|---|
| 3,707,234 A | * 12/1972 | Salemi .................. 210/321.87 |
| 4,454,207 A | 6/1984 | Fraioli et al. | |
| 4,490,444 A | 12/1984 | Isenberg ...................... 429/31 |
| 4,567,117 A | 1/1986 | Patel et al. | |
| 4,728,584 A | 3/1988 | Isenberg ...................... 429/31 |
| 4,729,931 A | 3/1988 | Grimble | |
| 4,791,035 A | 12/1988 | Reichner | |
| 5,002,647 A | 3/1991 | Tanabe et al. | |
| 5,077,148 A | 12/1991 | Schora et al. .................. 429/16 |
| 5,103,871 A | 4/1992 | Misawa et al. ........... 429/31 X |
| 5,169,731 A | * 12/1992 | Yoshimura et al. ....... 429/32 X |
| 5,244,752 A | 9/1993 | Zymboly ...................... 429/31 |
| 5,273,837 A | 12/1993 | Aitken et al. .................. 429/30 |
| 5,302,319 A | 4/1994 | Wright et al. | |
| 5,342,704 A | 8/1994 | Vasilow et al. ............... 429/31 |
| 5,380,600 A | 1/1995 | Hansen et al. | |
| 5,458,989 A | 10/1995 | Dodge .......................... 429/31 |
| 5,518,827 A | 5/1996 | Matsumura et al. | |
| 5,693,230 A | * 12/1997 | Asher ........................ 96/10 X |
| 5,763,114 A | 6/1998 | Khandkar et al. | |

(List continued on next page.)

FOREIGN PATENT DOCUMENTS

| | | | |
|---|---|---|---|
| DE | 3922673 | 1/1991 | ............ H01M/8/22 |
| DE | 199 57 641 | 1/2001 | ........... B02D/63/06 |
| EP | 0 451 971 | 10/1991 | ............ H02D/8/24 |
| EP | 0678597 A1 | 10/1995 | |
| EP | 0713931 A2 | 5/1996 | ............ H01M/8/22 |
| EP | 0 896 378 | 2/1999 | ............ H01M/8/02 |
| JP | 4-248272 | * 9/1992 | ............ H01M/8/12 |
| JP | 04-237964 | 1/1993 | ............ H01M/8/24 |
| JP | 10158894 | 6/1998 | ............ H01M/8/02 |
| JP | 11-226370 | 11/1999 | ........... B02D/71/02 |
| WO | WO 01/28011 A1 | 4/2001 | ............ H01M/4/62 |
| WO | WO 01/86030 | 11/2001 | ........... C25D/13/14 |

*Primary Examiner*—Stephen J. Kalafut
(74) *Attorney, Agent, or Firm*—Knobbe, Martens, Olson & Bear LLP

(57) ABSTRACT

This invention relates to a fuel cell sub-stack comprising a plurality of tubular fuel cells, and a solid-state matrix in which the fuel cells are embedded. Each fuel cell comprises an inner electrode layer, an outer electrode layer, and an electrolyte layer sandwiched between the inner and outer electrode layers. The matrix is electronic or mixed (electronic and ionic) conductive, porous enough for a first reactant to flow through the matrix and to the outer electrode of each fuel cell, and strong enough to support the fuel cells in the stack. The fuel cells are embedded such that a second reactant may be flowed through the inside of each tubular fuel cell and to the inner electrode thereof. The sub-stack may be combined with other sub-stacks to form a fuel cell stack.

35 Claims, 12 Drawing Sheets

U.S. PATENT DOCUMENTS

| | | |
|---|---|---|
| 5,807,642 A | 9/1998 | Xue et al. .................... 429/33 |
| 5,827,620 A | 10/1998 | Kendall ....................... 429/31 |
| 5,895,573 A * | 4/1999 | Scharstuhl ............. 210/321.87 |
| 5,908,713 A | 6/1999 | Ruka et al. .................. 429/31 |
| 5,935,727 A | 8/1999 | Chiao ......................... 429/32 |
| 5,942,348 A | 8/1999 | Jansing et al. ............... 429/32 |
| 5,952,116 A | 9/1999 | Blum et al. .................. 429/26 |
| 5,976,721 A | 11/1999 | Limaye |
| 5,993,985 A | 11/1999 | Borglum ...................... 429/31 |
| 5,993,989 A | 11/1999 | Baozhen et al. |
| 6,001,501 A | 12/1999 | Collie ......................... 429/31 |
| 6,007,932 A | 12/1999 | Steyn ......................... 429/31 |
| 6,017,646 A | 1/2000 | Prasad et al. |
| 6,051,173 A | 4/2000 | Fasano et al. |
| 6,051,330 A | 4/2000 | Fasano et al. ................ 429/30 |
| 6,074,771 A | 6/2000 | Cubukcu et al. .............. 429/30 |
| 6,099,985 A | 8/2000 | Elangovan et al. ........... 429/44 |
| 6,183,897 B1 | 2/2001 | Hartvigsen et al. .......... 429/32 |
| 6,207,311 B1 | 3/2001 | Baozhen et al. .............. 429/31 |
| 6,214,490 B1 | 4/2001 | Pate ............................ 429/94 |
| 6,217,822 B1 | 4/2001 | Borglum |
| 6,238,819 B1 | 5/2001 | Cahill et al. ................ 429/162 |
| 6,290,756 B1 * | 9/2001 | Macheras et al. ........... 96/10 X |
| 6,312,847 B1 | 11/2001 | Tsukuda et al. .............. 429/31 |
| 6,436,565 B1 * | 8/2002 | Song et al. ................... 429/31 |
| 2003/0134170 A1 | 7/2003 | Sarkar et al. |
| 2003/0134171 A1 | 7/2003 | Sarkar et al. |
| 2003/0134176 A1 * | 7/2003 | Sarkar ..................... 429/32 X |

\* cited by examiner

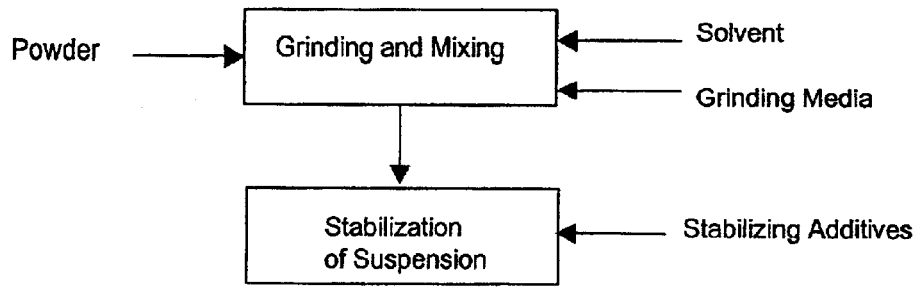
Two EPD suspensions are prepared (anode suspension and electrolyte suspension) for fuel cells having inner electrode and electrolyte to be formed by EPD. Anode suspension is made using NiO and yittria stabilized zirconia powder and electrolyte suspension is made using yittria-stabilized zirconia.
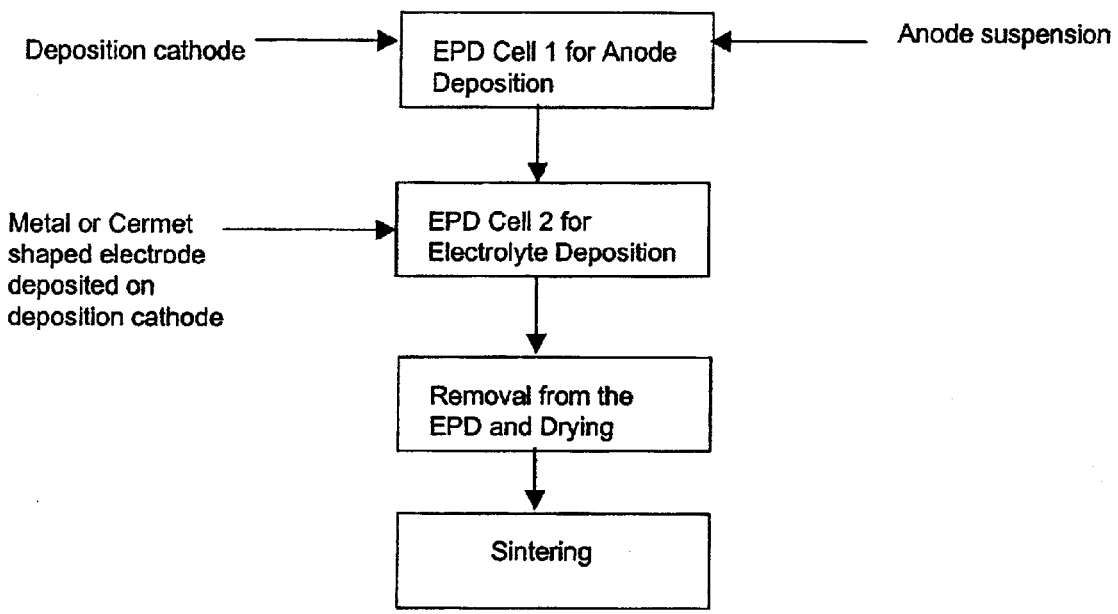
Figure 10

TUBULAR SOLID OXIDE FUEL CELL STACK

This application is a CIP of Ser. No. 10/053,241 filed Jan. 16, 2002.

FIELD OF THE INVENTION

This invention relates generally to fluid separators and in particular to a stack of tubular solid oxide fuel cells.

BACKGROUND OF THE INVENTION

In general, a solid oxide fuel cell (SOFC) comprises a pair of electrodes (anode and cathode) separated by a ceramic, solid-phase electrolyte. To achieve adequate ionic conductivity in such a ceramic electrolyte, the SOFC operates at an elevated temperature, typically in the order of about 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction:

$$H_2 + O^- \rightarrow H_2O + 2e^-$$

$$CO + O^- \rightarrow CO_2 + 2e^-$$

$$CH_4 + 4O^- \rightarrow 2H_2O + CO_2 + 8e^-$$

Cathode reaction:

$$O_2 + 4e^- \rightarrow 2O^-$$

Known SOFC designs include planar and tubular fuel cells. Applicant's own PCT application no. PCT/CA01/00634 discloses a method of producing a tubular fuel cell by electrophoretic deposition (EPD). The fuel cell comprises multiple concentric layers, namely an inner electrode layer, a middle electrolyte layer, and an outer electrode layer. The inner and outer electrodes may suitably be the anode and cathode respectively, and in such case, fuel may be supplied to the anode by passing through the tube, and air may be supplied to the cathode by passing over the outer surface of the tube.

It is also known to arrange a plurality of tubular fuel cells in an array or "stack" to increase electrical output. Designs have been proposed for stacking together relatively large-diameter ($\geq 2$ mm) thick-walled tubular fuel cells that are essentially self-supporting; for example it is known to stack large diameter tubular fuels cells in a grid-like pattern and interconnect the fuel cells with nickel felt spacers. This and other known designs for large diameter self-supporting tubular fuel cells are not particularly well suited for small diameter fuel cells ($\leq 2$ mm), especially if such small diameter fuel cells are arranged into a tightly-packed array. It is therefore desirable to provide an improved stack design that enables the close-packing of a plurality of small-diameter tubular fuel cells.

SUMMARY OF THE INVENTION

According to one aspect of the invention, there is provided a fuel cell stack comprising a plurality of tubular fuel cells embedded in a solid-state electronic or mixed (electronic and ionic) conductive porous matrix. Each fuel cell comprises an inner electrode layer, an outer electrode layer, and an electrolyte layer sandwiched between the inner and outer electrode layers. A first reactant is flowable through the matrix and to the outer electrode layer of at least one of the fuel cells, and a second reactant is flowable through the inside of at least one of the fuel cells and to the inner electrode thereof. The matrix may have a foam-like microstructure, and may have a porosity of between 40 and 95%.

The fuel cells may be of the solid-oxide type and in such case the matrix composition may include an electronic or mixed conductive material. In particular, the matrix material may be lanthanum strontium manganate. The diameter of at least one of the fuel cells may be in the range of about 10 $\mu$m to 2000 $\mu$m. The inner electrode layer may be an anode and the outer electrode layer a cathode, and in such case, the first reactant is oxidant and the second reactant is fuel. The inner electrode layer of at least one the fuel cells may be produced by one of electrophoretic deposition, metal electrodeposition, or composite electrodeposition.

According to another aspect of the invention, there is provided a method of producing a fuel cell stack that comprises:

(a) producing a plurality of tubular fuel cells, each fuel cell having an inner electrode layer, an outer electrode layer, and an electrolyte layer sandwiched between the inner and outer electrode layers;

(b) coating the fuel cells with a slurry having a composition that includes a matrix material that upon sintering, becomes a solid-state electronic or mixed (electronic and ionic) conductive porous matrix;

(c) stacking the fuel cells such that the slurry coating of each fuel cell is in contact with the slurry coating of adjacent fuel cells; and (d) sintering the coated and stacked fuel cells to solidify the matrix and embed the fuel cells therein, thereby producing a stack wherein a first reactant is flowable through the matrix and to the outer electrode layer of at least one of the fuel cells, and a second reactant is flowable through the inside of at least one of the fuel cells and to the inner electrode thereof.

The step of producing the fuel cell may comprise first forming an inner electrode layer on a combustible deposition cathode by one of electrophoretic deposition, metal electrodeposition, or composite electrodeposition, then forming an electrolyte layer on the inner electrode layer by electrophoretic deposition, then forming an outer electrode layer onto the electrolyte layer, and then applying a sintering step that combusts the deposition cathode, thereby leaving a hollow tubular fuel cell.

The matrix material in the slurry may be one in the group of lanthanum strontium manganate, doped $LaCrO_3$ ($La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$, $LaCr(Mg)O_3$, stainless steel (316, 316L), cermet (such as Ni-Yittria stabilized zirconia or any Ni and doped zirconia cermet, Ni doped—$CeO_2$ cermet, Cu doped-ceria cermet), silver and its alloys, Inconel steel or any super alloy, or ferritic steel, SiC, $MoSi_2$. The slurry may further include a foaming agent, such that upon a selected heat treatment, a solid-state porous matrix is formed having a foam-like microstructure. The slurry may also or instead include combustible particles, such that upon a selected heat treatment, a solid-state porous matrix is formed having a porous microstructure.

The steps of coating the fuel cells with slurry and stacking the fuel cells may comprise stacking the fuel cells in a container, then adding the slurry into the container such that the fuel cells in the container are immersed in the slurry. Alternatively, the steps of coating the fuel cells with slurry and stacking the fuel cells comprise coating each fuel cell then placing combustible spacers between the fuel cells before stacking. Yet another alternative approach comprises coating the fuel cells then placing the coated fuel cells on a flexible sheet, then manipulating the sheet such that the fuel cells are arranged into a desired stack configuration.

According to yet another aspect of the invention, there is provided a method of producing a fuel cell stack that comprises:

(a) producing a plurality of tubular fuel cells, each fuel cell having an inner electrode layer, an outer electrode layer, and an electrolyte layer sandwiched between the inner and outer electrode layers;

(b) providing a container of combustible members in a desired stack configuration and immersed in a slurry having a composition that includes a matrix material that upon sintering, becomes a solid-state electronic or mixed (ionic and electronic) conductive porous matrix;

(c) sintering the slurry and combustible members such that the matrix is formed and the combustible members combust, thereby producing a plurality of channels in the matrix; and, (d) inserting at least one fuel cell into at least one channel; thereby producing a stack wherein a first reactant is flowable through the matrix and to the outer electrode layer of at least one of the fuel cells, and a second reactant is flowable through the inside of at least one of the fuel cells and to the inner electrode thereof. This method may include the further step of (e) adding slurry into the channel between the fuel cell and the matrix, then sintering the slurry such that the fuel cell is securely embedded in the matrix.

According to yet another aspect of the invention, there is provided a method of producing a fuel cell stack that comprises:

(a) producing a plurality of tubular fuel cells, each fuel cell having an inner electrode layer, an outer electrode layer, and an electrolyte layer sandwiched between the inner and outer electrode layers;

(b) embedding the fuel cells in a combustible template material;

(c) impregnating the template material with a slurry having a composition that includes a matrix material that upon sintering, becomes a solid-state electronic or mixed (ionic and electronic) conductive porous matrix; and, (d) sintering the impregnated and fuel cell embedded template material such that the template material combusts, and the matrix is formed;

thereby producing a stack wherein a first reactant is flowable through the matrix and to the outer electrode layer of at least one of the fuel cells, and a second reactant is flowable through the inside of at least one of the fuel cells and to the inner electrode thereof. The template material may be one in the group of a sponge, carbon felt, or graphite felt.

According to yet another aspect of the invention, there is provided a fluid separation apparatus that comprises a plurality of tubular fluid separation membrane assemblies and a solid-state porous matrix in which the assemblies are embedded. Each assembly comprises a porous separation layer and a porous support layer in adjacent contact with the separation layer. The porosity of the separation layer is selected according to the fluids to be separated. An unseparated fluid is flowable through one of the matrix or the inside of at least one of the assemblies, and a separated fluid separated from the unseparated fluid by the separation layer is flowable through the other of the matrix and the inside of at least one of the assemblies.

The separation layer may have a thickness of between about 0.5 to 30 $\mu$m, a porosity of less than or equal to 0.3 $\mu$m, and a composition that includes one or more of $Al_2O_3$, zirconia, $Al_2O_3$—zirconia composites or $TiO_2$. The porosity of the support layer may be greater than or equal to 0.3 $\mu$m, and may have a composition that includes one or more of $Al_2O_3$, zirconia, $Al_2O_3$—zirconia composites, clay, or $TiO_2$.

The matrix may have a foam-like microstructure and a composition that includes one or more of $Al_2O_3$, zirconia, $Al_2O_3$—zirconia composites or steel. The matrix may also be coated with $TiO_2$ photo catalyst.

The separation layer may serve as a membrane reactor and thus have a composition that includes material that affects the conversion or selectivity of one or more chemical reactions of the fluids flowable through the apparatus. In particular, the membrane reactor layer may have a composition that includes Pd or Pd-alloy, and a thickness of between about 0.5 and 10 $\mu$m.

DETAILED DESCRIPTION OF DRAWINGS

FIGS. 5(*a*) and (*b*) are schematic end views of fuel cell stacks comprising a plurality of tubular fuel cells embedded in the matrix (FIG. 5(*a*)) and a plurality of fuel cells and sub-stacks of fuel cells embedded in the matrix (FIG. 5(*b*)).

Figure 6:
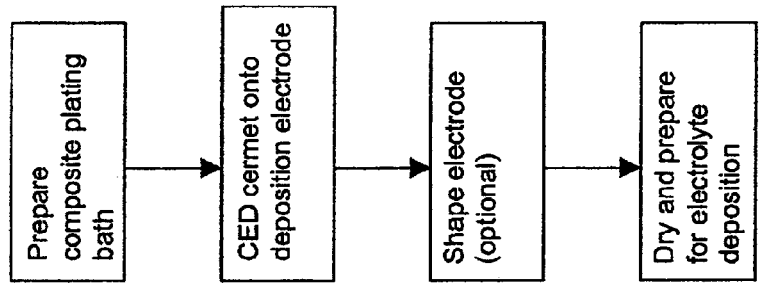
Figure 6:
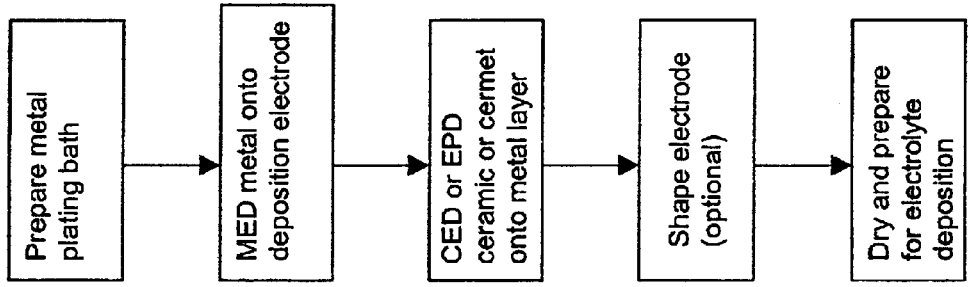

FIGS. 6(*a*) and 6(*b*) are flowcharts of the steps for producing an inner electrode of a tubular SOFC; in particular, FIG. 6(*a*) illustrates the production of a dual-layered electrode structure, and FIG. 6(*b*) illustrates the production of a single-layered electrode structure.

Figure 7:
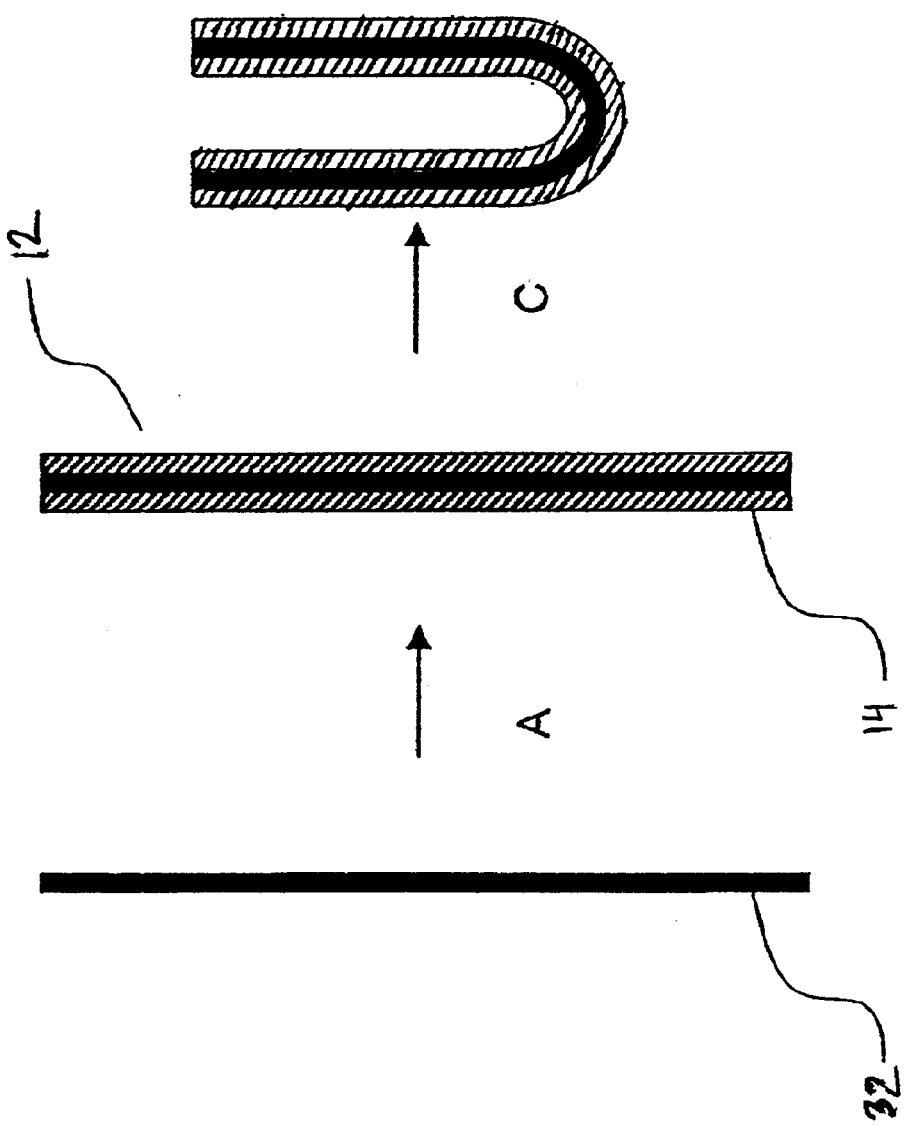

FIG. 7 is a schematic illustration of the method of producing a single-layered electrode as shown in the flowchart of FIG. 6(*b*).

Figure 8:
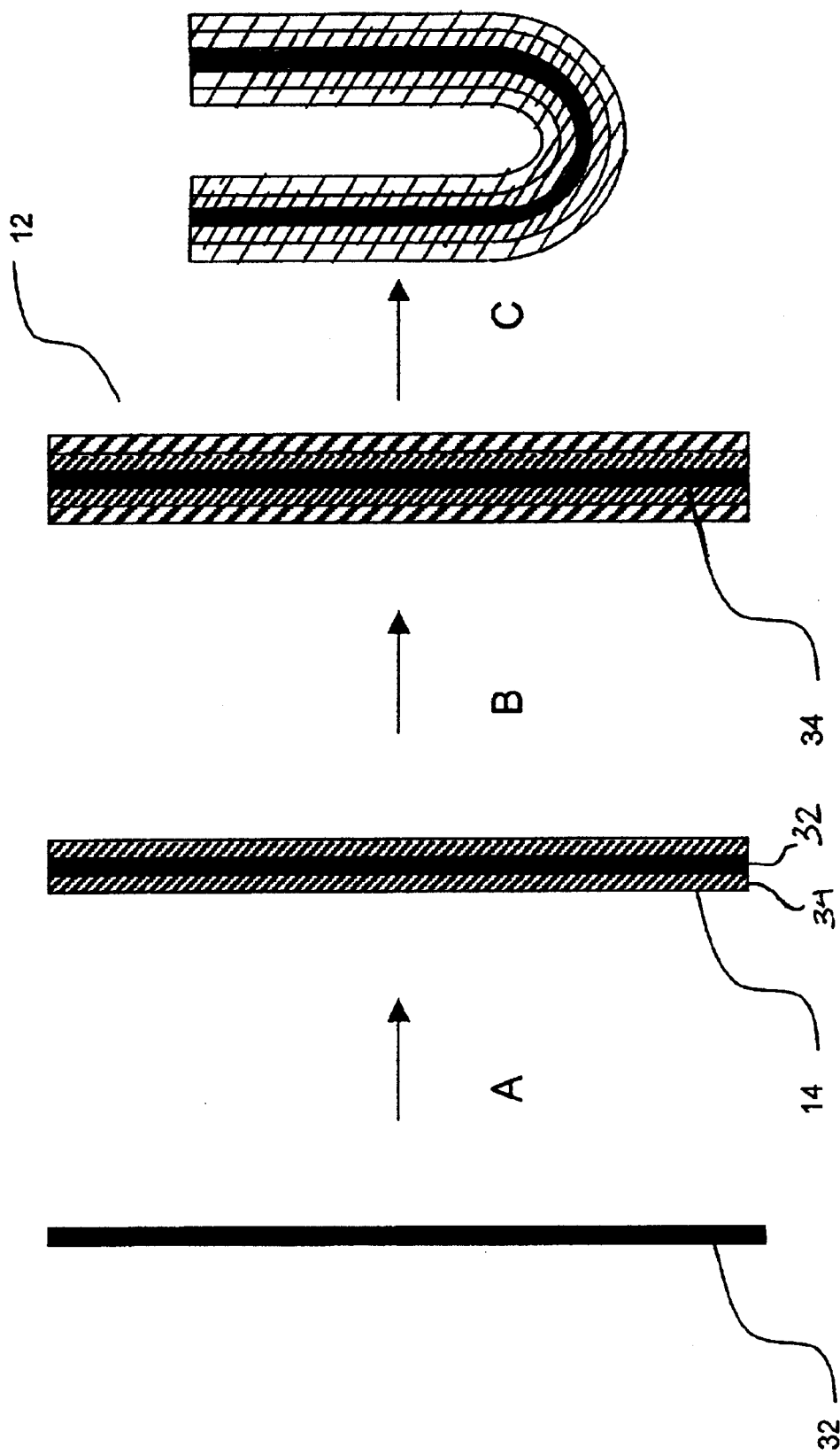

FIG. 8 is a schematic illustration of the method of producing a dual-layered electrode structure as shown in the flowchart of FIG. 6(*a*).

Figure 9:
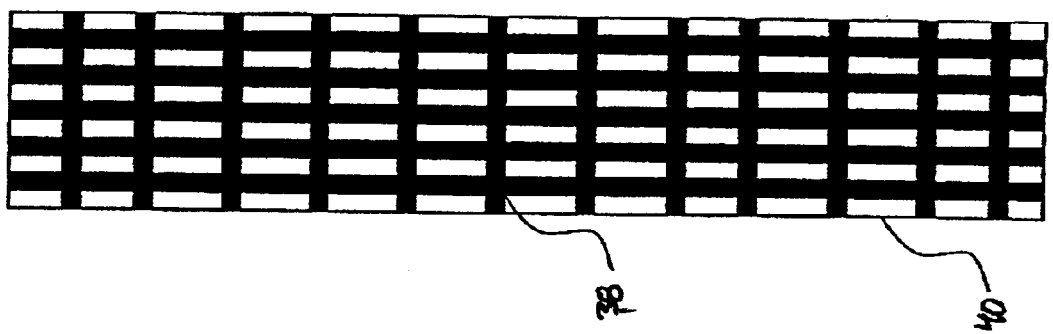
Figure 9:
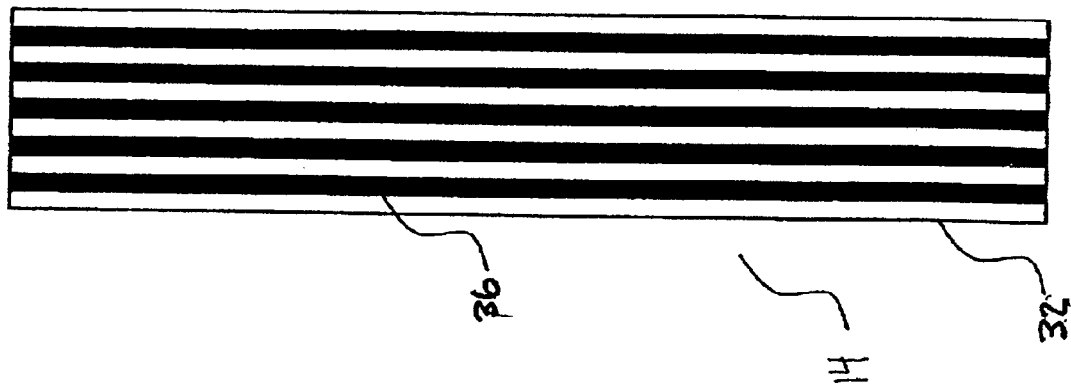

FIGS. 9(*a*) and 9(*b*) are schematic illustrations of forming openings in a fuel cell electrode by applying masking strips over a conductive core.

FIG. 10 is a flowchart of a method of producing an electrolyte by electrophoretic deposition (EPD) on the electrode of FIG. 6(*a*) or 6(*b*).

Figure 11:
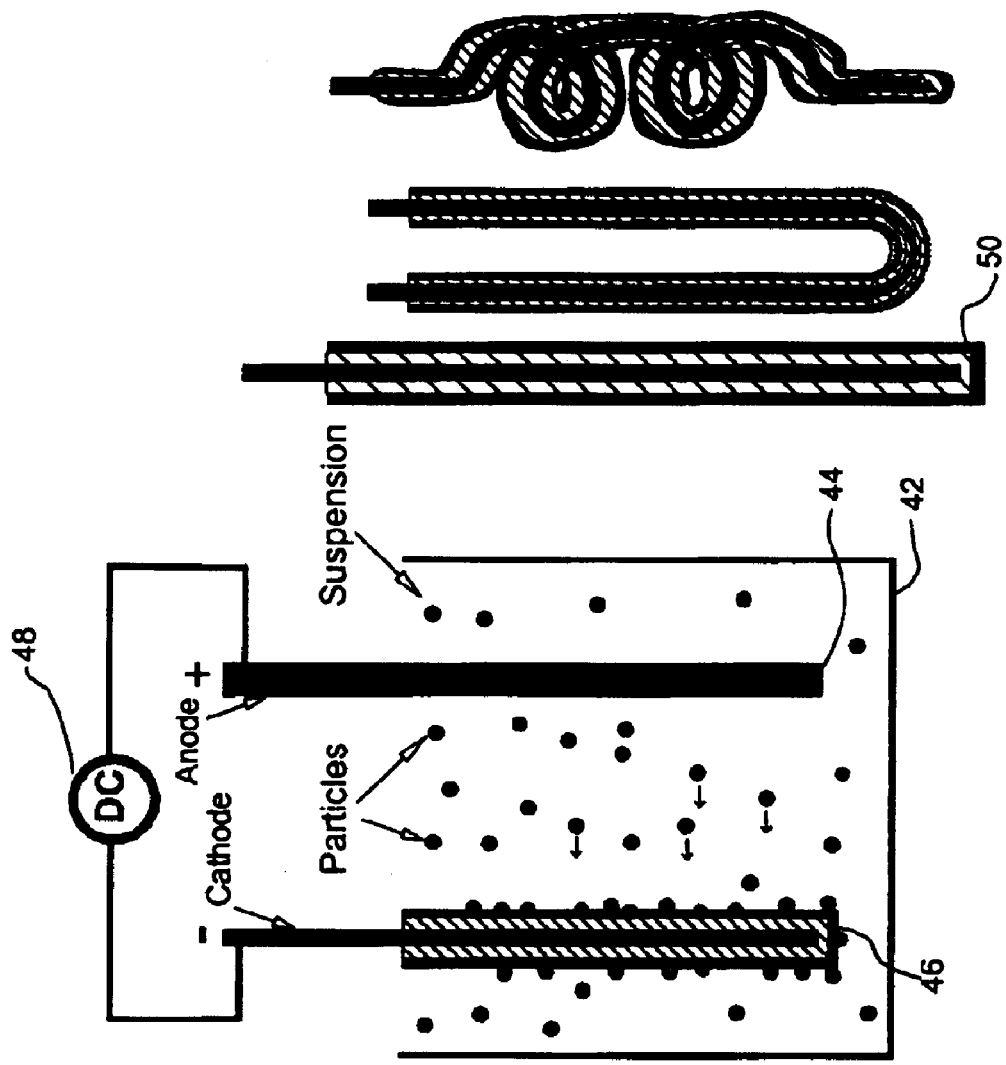

FIG. 11 is a schematic illustration of an EPD apparatus used to produce the electrolyte shown in FIG. 10.

Figure 12:
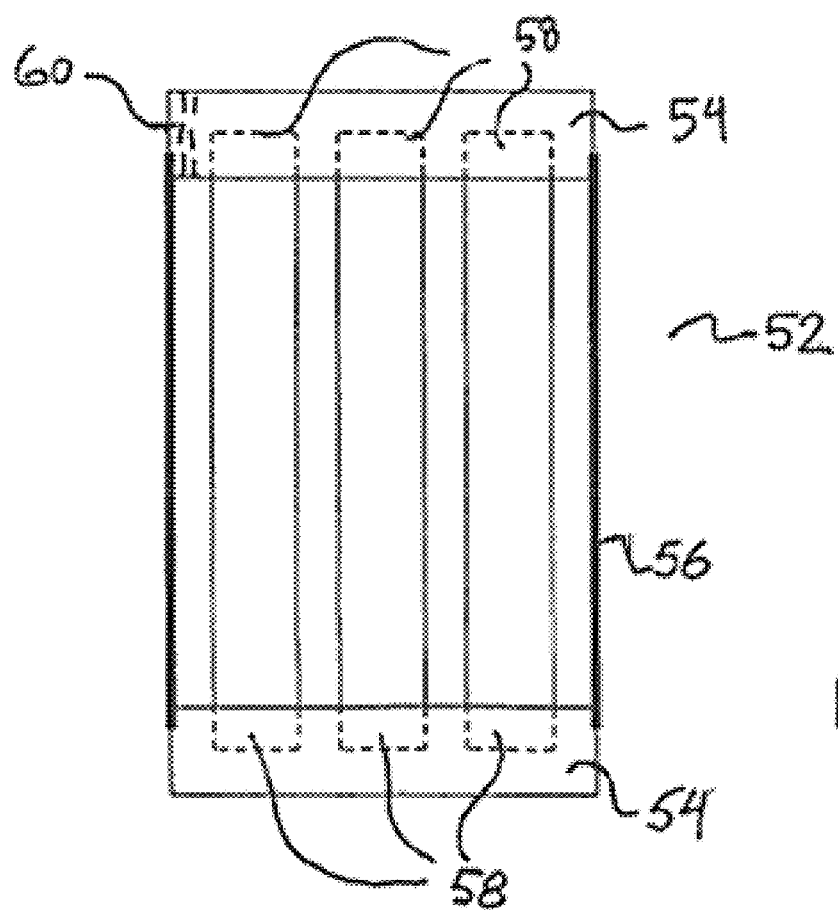

FIG. 12 is a schematic elevation view of an apparatus for embedding fuel cells in the matrix.

Figure 13:
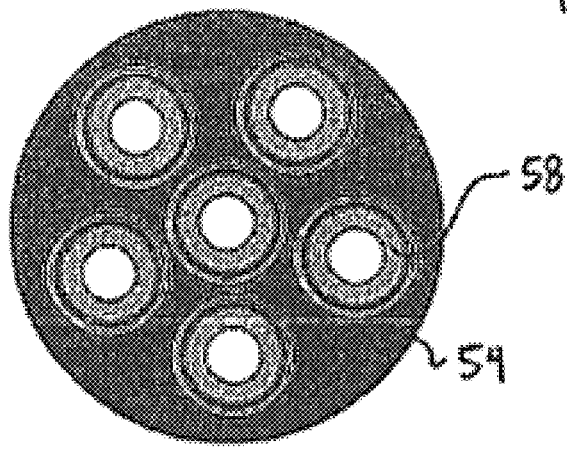

FIG. 13 is a schematic end view of the apparatus for embedding fuel cells in the matrix, as shown in FIG. 12.

DETAILED DESCRIPTION

Definitions

When describing the present invention, the following terms have the following meanings, unless indicated otherwise. All terms not defined herein have their common art-recognized meanings.

The term "fibre" or "filament" refers to a single strand of fibrous material; "fibre tow" or "fibre bundle" shall refer to a multi-filament yarn or an array of fibres; and "fibre core" shall refer to a fibre, filament, fibre tow or fibre bundle. In all cases, the fibre core is electrically conductive or treated to be electrically conductive to allow its use as an electrode.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and nonoxide compounds including but not limited to carbides (such as of titanium tungsten, boron, silicon), silicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, and ceramic solid ionic conductors (such as yittria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

The term "hollow inorganic membrane (HIM)" refers to a tubular body comprising an inorganic material. The cross-sectional geometry may be any shape such as circular, square, rectangular, triangular, and polygonal. The longitudinal geometry of the tubular body may be any shape such as elongate, serpentine, and coiled. The membrane may be porous or non-porous. The inorganic material includes metal, cermet composite, ceramic, and ceramic—ceramic composites.

The term "porous" in the context of hollow ceramic, metal, and cermet membranes and matrices means that the ceramic material contains pores (voids). Therefore, the density of the porous membrane material is lower than that of the theoretical density of the material. The voids in the porous membranes and matrices can be connected (i.e., channel type) or disconnected (i.e. isolated). In a porous hollow membrane or matrix, the majority of the pores are connected. To be considered porous as used herein in reference to membranes, a membrane should have a density which is at most about 95% of the theoretical density of the material. The amount of porosity can be determined by measuring the bulk density of the porous body and from the theoretical density of the materials in the porous body. Pore size and its distribution in a porous body can be measured by mercury or non-mercury porosimeters, BET or microstructural image analysis as is well known in the art.

The term "fuel cell sub-stack" refers to a group of two or more fuel cells for use in a fuel cell stack, wherein the fuel cells in the sub-stack are connected in parallel such that the current produced by the sub-stack is the additive current of each fuel cell in the sub-stack.

The term "fuel cell stack" refers to a group of one or more fuel cells and/or fuel cell sub-stacks for use in a fuel cell system.

Structure

Figure 1:
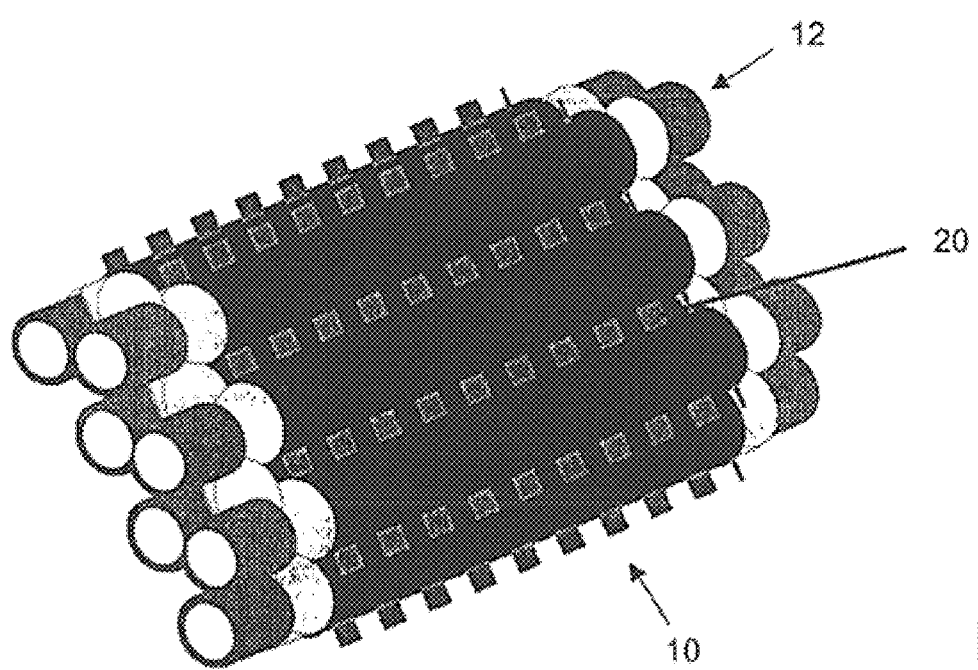
FIG. 1 is a schematic perspective view of a stack of fuel cells stacked together and embedded in a foam-like porous matrix.
Figure 2:
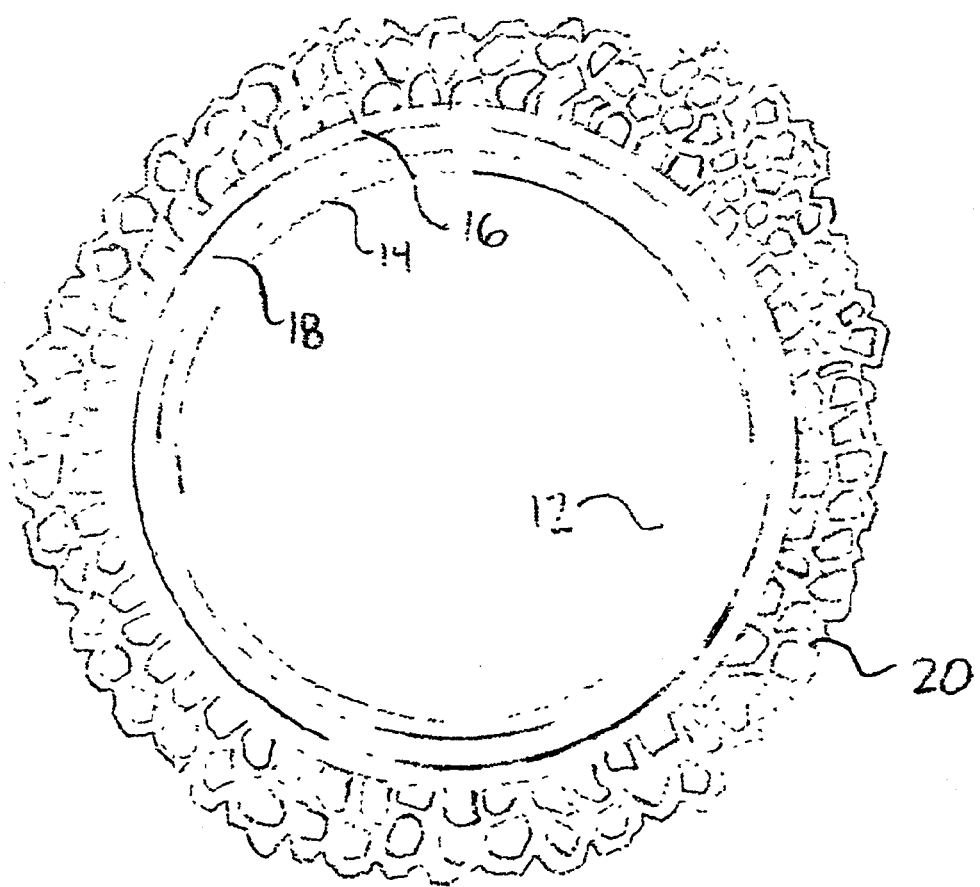
FIG. 2 is a schematic end view of one tubular fuel cell embedded in the matrix.
Figure 3:
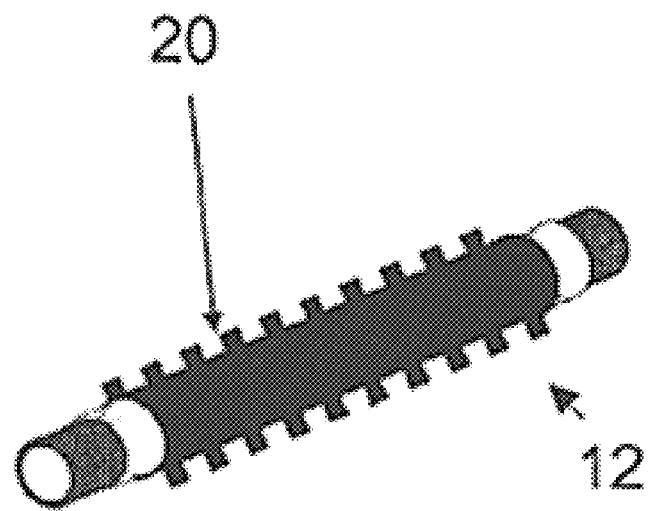
FIG. 3 is a schematic perspective view of the fuel cell and matrix of FIG. 2.

Referring to FIG. 1, and according to one embodiment of the invention, a fuel cell stack 10 includes a plurality of tubular solid oxide fuel cells 12 wherein each tube is arranged longitudinally parallel to each other. Referring to FIGS. 2 and 3, each fuel cell 12 comprises three concentric hollow inorganic membranes (HIM) that are in continuous contact with each other to form a multi-membrane structure. The inner and outer membranes 14, 16 serve as electrodes, and the middle membrane 18 serves as an electrolyte.

To serve as electrodes, the inner and outer membranes, 14, 16 are made of a material that is porous, catalytic, and electrically and ionically conductive. This enables the electrodes to collect electrical current, to allow reactant to flow to the electrolyte, to encourage electrochemical reactions, and to conduct ions that permeate through the electrolyte 18. In this embodiment, the inner electrode 14 is made of a nickel and zirconia cermet and serves as the anode in the fuel cell 12. The anode 14 may optionally have a thin layer of nickel on the inner surface of the cermet layer, such that a two-layered anode structure is provided. The outer electrode 16 is made of LSM and serves as the cathode in the fuel cell. The electrolyte 18 is made of a zirconia ceramic material. The anode 14 preferably has a thickness of between 1 $\mu$m to 200 $\mu$m. The cathode 16 preferably has a thickness of between 1 $\mu$m to 200 $\mu$m. The electrolyte 18 preferably has a thickness of between 0.5 $\mu$m to 25 $\mu$m.

In certain commercial applications, it is desirable to provide a fuel cell system having a relatively high power density, i.e. a fuel cell system that provides a high power-to-volume ratio. Such high power densities may be achieved by assembling the fuel cells 12 in close proximity to each other to produce the fuel cell stack 10. Also, higher power densities can be achieved by increasing the active surface area per unit volume of the system; for example, the active surface area per unit volume can be increased by decreasing the diameter each tubular fuel cell 12, thereby increasing the number of fuel cells 12 that can be stacked in a given volume. Therefore, it is preferred to employ small-diameter tubular fuel cells 12 having a 10 $\mu$m to 2000 $\mu$m diameter in this embodiment. Such small-diameter fuel cells 12 especially if made of ceramic or some of its composites tend to be somewhat fragile, and are relatively vulnerable to damage when assembled into a tightly packed array; that is, ceramic structures being brittle tend to fail catastrophically. Thin walled elongate ceramic structures tend to be particularly fragile, and may fail when subjected to bending forces or vibrations that exceed the fracture stress of the ceramic. Therefore, the fuel cells 12 are embedded in a foam-like porous material 20 ("matrix") that inter alia, serves as a support structure for the fuel cells.

The matrix 20 is made from ceramic or another material that is able to withstand typical SOFC operating temperatures, e.g. steel or a superalloy. Preferably, the matrix 20 is made of LSM to enable it to operate at around 1000° C. This material also enables the matrix 20 to serve as a cathode, i.e. to collect current, to ionize oxygen into oxide ions, and to conduct these ions to the electrolyte. The matrix fills 20 the spaces between the fuel cells and contacts the outer surface of each fuel cell 12, i.e. the cathode layer 16 of each fuel cell 12. Because the matrix 20 is of the same material as the cathode layer 16, the matrix 20 serves to increase the effective surface area of the cathode, thereby increasing the area for collecting electrons, and ionizing oxygen (see FIG. 3). Although the matrix 20 in this embodiment is made of LSM, the matrix 20 may alternatively be made of any suitable electronic or mixed (electronic and ionic) conductive porous solid state material. As an electronic conductor, the matrix 20 can carry electricity by electron transportation, e.g. metals. As a mixed conductor, the matrix 20 can carry electricity by electron and ion transportation, e.g. LSM or metal/ceramic composite. As an ionic conductor, the matrix 20 can carry electricity by ion transportation, e.g. Yittria-doped zirconia.

Figure 4:
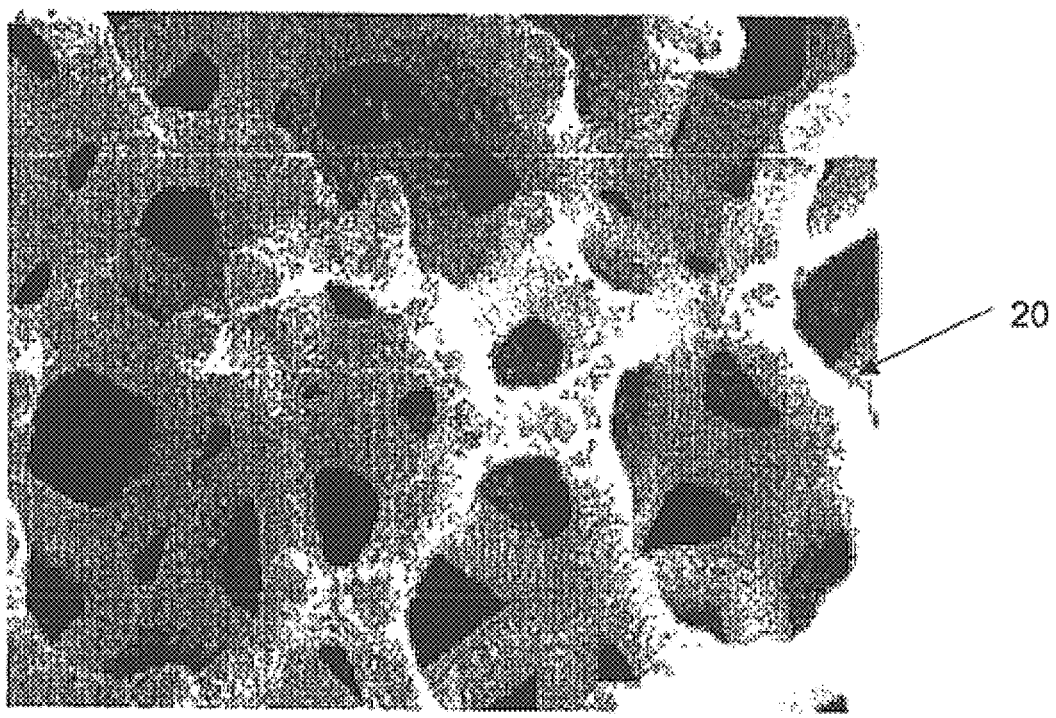
FIG. 4 is an SEM micrograph of the ceramic porous matrix.

The matrix 20 is porous (with channel-type connected pores) to allow the flow through of oxidant through the stack 10, and to the cathode layer 16 of each fuel cell 12. The porosity of the matrix 20 is selected to provide a sufficient oxidant flow-through rate and sufficient mechanical strength to serve as a support structure for the fuel cell stack 10. In this connection, the matrix 20 has a porosity of between 40–95% and preferably about 60%. Referring to FIG. 4, the matrix has a foam-like porous microstructure.

By assembling a plurality of fuel cells 12 into the stack 10, commercially useful electrical power levels may be achieved. As the matrix 20 is electrically conductive, each of the fuel cells 12 contacting the matrix 20 are electrically connected in parallel to each other, such that the effective voltage of the sub-stack is equal to the voltage of the single cell 12 with the highest voltage and the effective current of the sub-stack 20 is the additive sum of the current produced by each fuel cell 12.

Figure 5A:
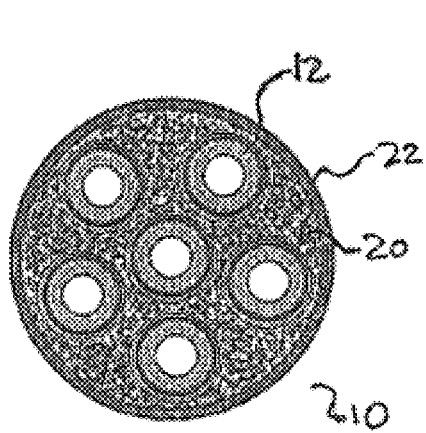

Referring to FIG. 5(a) the fuel cell stack 10 can be formed having a plurality of fuel cells 12 embedded in the matrix 20. Each of the fuel cells 12 in this stack are connected in parallel. The stack is enclosed in container 22 that is reactant impermeable, and thermally and electrically insulating. A suitable material for the container is a ceramic such as alumina, zirconia, alumina-zirconia composite, spinel, silica, ceramic arogel, or porous ceramics where the pores are disconnected. The container may have two layers wherein the inner layer is made of a steel or superalloy, and the outer layer is made of ceramic.

Figure 5B:
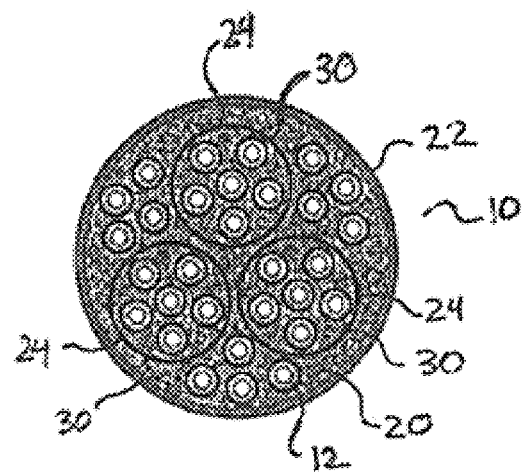

Referring to FIG. 5(b), the fuel cell stack 10 can be formed having a mixture of a plurality of individual fuel cells 12 and fuel cell sub-stacks 30 embedded in the matrix 20. A fuel cell sub-stack 30 is one or more fuel cells 12 embedded in the matrix 20 that are electrically insulated from other fuel cells 12 in the stack 10 in such a manner that the sub-stack 30 can be electrically connected in series with other sub-stacks 30 or fuel cells 12 in the stack 10. Each sub-stack 30 is surrounded by an electrical or a thermal and electrical insulator 24. The insulator 24 prevents the matrix 20 inside the sub-stack 30 from electrically contacting the matrix outside the sub-stack 30, thereby preventing the fuel cells 12 inside the sub-stack 30 from short-circuiting with other fuel cells 12 or sub-stacks 30 in the stack 10.

The insulator 24 is a flexible sheet that wraps around the sub-stack 30; the sheet extends the length of the fuel cells 12, and may be made of $Al_2O_3$ (dense or porous), ceramic felt, or a composite material of an exterior metal shell with an interior insulating ceramic lining. Alternatively, the insulator may be a rigid two layered shell having an exterior ceramic layer and an interior conducting metal lining.

The stack 10 as shown in either of FIGS. 5(a) or (b) is enclosed in a container 22, and can be combined with other fuel cell components (not shown) to form a fuel cell system, e.g. a fuel and oxidant inlet manifold that is attachable to the inlet end of the stack 30, a fuel and oxidant outlet manifold that is attachable to outlet end of the stack 30, etc. When assembled, the fuel cell system operates by transmitting fuel from a fuel source (not shown) through the inlet manifold and through the inside of each individual fuel cell 12 such that fuel reaches the anode surface 14 of each fuel cell 12, and by transmitting oxidant from an oxidant source (not shown) through the inlet manifold and through the porous matrix 20 in which the fuel cells 12 are embedded, such that oxidant reaches the cathode surface 16 of each fuel cell 12. Unused fuel and spent oxidant are then exhausted from the stack 30 via the outlet manifold. An electrical current generated by the electrochemical reaction in each fuel cell is collected by the anode 14 and transmitted to the ends of each fuel cell and to an external circuit, to a load connected to the circuit, then back to the cathode 16 of each fuel cell.

Manufacture

A method of manufacturing the tubular fuel cells 12 and of embedding these fuel cells 12 in the porous matrix 20 is described in the following paragraphs.

A. Forming a Tubular Fuel Cell

Referring to FIGS. 6–11, the inner electrode layer 14 of each fuel cell 12 may be formed by depositing cermet material on a combustible electrically conductive core 32 (and commonly referred to as a "deposition electrode") by electrophoretic deposition (EPD), or by composite electrodeposition (CED). The electrolyte layer 18 may be formed by depositing YSZ material onto the inner electrode layer 14 by EPD. The outer electrode layer 16 may be formed by first applying a LSM layer onto the electrolyte 18 by one of dip-coating, painting, or EPD.

The process for producing an inner electrode and electrolyte by EPD is described in Applicant's PCT application no. PCT/CA01/00634. CED is a process of depositing a composite material (e.g. cermet) onto a conductive core by electrolysis and is shown in FIGS. 6(b) and 7. The CED process requires two deposition electrodes (anode and cathode), an electrolyte bath (i.e. composite solution), and a source of electrons. The metal salt solution may suitably be Krohn Bright Nickel Electrolyte Solution by Krohn Technical Products, Carlstadt N.J. 07072 in which ceramic particles are added. The electrons "e" may be supplied by an external DC current source that is connected via an external circuit to the deposition anode and cathode. Upon application of current to a composite CED solution, metal ions $M^{n+}$ and ceramic particles travel through the bath from the deposition anode and deposit on the deposition cathode, and electrons travel via the circuit from the deposition anode to the deposition cathode. The current is applied until a membrane layer of a desired thickness has been deposited on the deposition electrode.

Optionally, an electrically conductive metal layer 34, e.g. nickel, may be first deposited on the deposition electrode 32 before the cermet layer is deposited (see FIG. 6(a) and FIG. 8). The nickel layer may be deposited by metal electrodeposition (MED), which is similar to CED except that the electrolyte bath is a metal salt solution, and that upon electrolysis, a metal layer is deposited on the deposition electrode. Other suitable metals include copper, palladium, chromium, platinum, gold, silver and/or their alloys. If the inner electrode 14 is to serve as a cathode, the inner electrode 14 preferably comprises one of platinum, gold, silver and/or their alloys. The metal salt solution may suitably be Krohn Bright Nickel Electrolyte Solution. Nickel is a particularly suitable choice for use in the anode, as it is relatively cheap, is effective as an electron conductor and as a catalyst for the anode, and helps to break down natural gas fuel into hydrogen atoms and carbon monoxide.

The inner electrode as anode 14 can be made porous by adding to the electrolyte bath combustible additives such as carbon, carbon black, graphite powder, corn starch, and rice starch. As discussed in more detail below, a sintering process is applied to the electrode 14 that causes the combustible materials to burn away, leaving behind pores in the electrode 14.

Preferably, the anode 14 is porous and is deposited around the deposition electrode 32 such that it completely surrounds the deposition electrode 32. However, according to an alternative embodiment of the invention, nonconductive masking material (FIGS. 9(a) and (b)) may be placed on the deposition electrode 32 prior to MEO, such that when the anode materials are deposited, they are deposited only on the portions of the deposition electrode not covered by the masking material. After the masking material is removed, an anode 14 is formed having openings 40 (where the masking material used to be) that allow access of reactant to the electrolyte 18. The masking material may be in the form of spaced parallel strips 36. Or, the masking material may take the form of a rectangular mesh 38; after the mesh is removed, an anode 14 is formed having a pattern of rectangles corresponding to the openings of the mesh 38. It is evident that the masking material may be arranged in a number of other shapes. For example, the strips may comprise a plurality of squares such that when the strips are removed, an anode is formed having a mesh-like pattern.

The electrode 14 can be formed on a number of different combustable, electrically conductive cores including a carbon fibre or carbon tow or a carbon rod. The carbon fibre may have a diameter of approximately 5 microns or less and may be suitable to produce very fine HIMs. At the other end of the range, fibre tow having a diameter of about 5 or 6 mm may be used to produce larger HIMs. At the larger end of the range, rods having a desired diameter may be used in place of fibre tow. As well, the rods may have any suitable cross-sectional configuration.

Fibre tow may be used either treated with a polymeric binder or untreated. A treated fibre core will produce a ceramic tube having substantially a single hole. A fibre core made from untreated fibre tow may result in a tube having a plurality of holes in a porous core. The fibre tow may be treated by briefly dipping the tow into a solution of an organic or polymeric binder. In one example, a solution of nitrocellulose in acetone is suitable. The nitrocellulose forms a very thin coating on the tow and seals the interfilamentous gaps. The binder should preferably be insoluble in the EPD medium. Nitrocellulose is a preferred binder because it is insoluble in ethanol, which is a preferred EPD medium.

If the intrafilamentous gaps are unsealed, as in untreated fibre tow, the deposited particles may infiltrate the tow during the deposition process, resulting in the porous core referred to above. The porous core may be preferred in some applications in which a high internal surface area may be beneficial. Examples of such application include high surface area catalyst supports or membrane reactors.

Referring again to FIGS. 6–8, after deposition of electrode material, the electrode 14 is disconnected from the electroplating apparatus external circuit and removed from the electrolyte bath. Then, if desired, it is manipulated into a suitable shape (step C in FIGS. 7 and 8). Both nickel and cermet layers are ductile (provided the cermet was deposited by CED), and enable the electrode 14 to be manipulated into a number of complex shapes without cracking. Also, carbon fibre and untreated fibre tow are flexible and can be manipulated into various shapes without breaking. If the fibre tow is treated with an organic binder, the manipulation should be made before the binder dries, since after drying, the binder will harden and become inflexible. If the binder does dry before manipulation, a solvent can be applied to the binder to soften it. If instead a polymer binder is used, manipulation may be made even after drying, as the polymer binder has a glass transition temperature ($T_g$) lower than room temperature and does not tend to harden after drying. Alternatively, a thermoplastic binder may be used, which hardens after drying, but can be made flexible by application of heat.

The electrode 14 can be manipulated into shapes that are particularly suitable for its intended application. For example, in SOFC applications, it is desirable to maximize the active surface area of the fuel cell in a given volume. Shapes that provide a high surface area per volume include coiled or serpentine shapes (see FIG. 11). Also, a fuel cell that has its reactant inlet and outlets at the same end may be advantageous: because a SOFC system operates at a very high temperature, the fuel cells must be effectively thermally insulated from other components in the system, and thus may be located inside a thermally insulated enclosure. It may be desirable to reduce the number of openings in the thermally insulated enclosure in order to reduce the complexity of the system design, and in this connection, the fuel cells can be shaped so that the inlets and outlets of the fuel cell pass through the same opening in the thermally insulated enclosure. In this connection, the electrode may be bent into a "U" shape so that a U-shaped fuel cell can be produced. Furthermore, a coiled or serpentine shaped fuel cell may also be formed such that the reactant inlets and outlets are at the same end.

Referring now to FIGS. 10 and 11, after the electrode 14 has been manipulated (if desired) into a desired shape, the electrode 14 is washed with water to rinse off any electrolyte bath solution, and dried (either at ambient or at an elevated temperature). Then, a ceramic electrolyte layer 18 is deposited by EPD onto the outside surface of the electrode 14 according to the following steps:

(a) prepare a EPD suspension comprising a selected ratio of ceramic powder, solvent and grinding media, by grinding and mixing these materials together until the average particle size reaches an appropriate size range. In one embodiment the particle size range may range from 150 nm to about 10,000 nm. The particles should preferably be no larger than 15,000 nm. More preferably, the particle size range may be between 200 nm to 1000 nm. As will be appreciated by those skilled in the art, larger particle sizes may result in the ceramic membrane having greater porosity than a ceramic membrane having a smaller particle size in identical sintering conditions (e.g. temperature, time, atmosphere);

(b) Add additional solvent to get the desired concentration; the solvent may a non-aqueous organic fluid such as ethanol, isopropanol, butanol, butylamine, acetylacetone, methyl ethyl ketone, acetone, methanol, absolute alcohol or mixtures thereof; suitable concentrations include 0.25 vol % to 30 vol % of particles in the suspension;

(c) Add additives to stabilize the suspension, e.g. acetic acid;

(d) Transfer the suspension to an EPD cell as shown in FIG. 11; the EPD cell includes container 42, a deposition anode 44, a deposition cathode 46 and an external DC electrical source 48;

(e) Place the electrode 14 in the suspension, and electrically connect it to the deposition anode 44; when so connected, the electrode 14 serves as the deposition cathode in the EPD process;

(f) Turn on the DC electrical source 48 to activate the EPD process; continue until the electrode 14 is coated with ceramic material of a desired thickness between the range of 1 $\mu$m to 1000 $\mu$m;

(g) Disconnect and remove the electrolyte/electrode assembly 50 from the circuit, and remove it from the EPD cell; and, (h) Dry the electrolyte/electrode assembly in preparation for sintering; drying may take place at room temperature or at a slightly elevated temperature.

After the electrolyte/electrode assembly has dried, it is sintered at a temperature sufficient to burn out the combustible conductive core 32 as well as any combustible additives in the membranes. The sintering also enables the electrolyte 18 to achieve full density while maintaining the porosity of the inner electrode 14. The sintering cycle for a zirconia deposit where the sintering atmosphere is air may begin by raising the temperature to about 500° C. to about 900° C at a heating rate of between 20° C./hr to 300° C./hr and preferably over a period of about 6 hours to about 9 hours and held that temperature for about 3 hours. The temperature may then be raised at a rate of about 100° C. to about 300° C. per hour to the sintering temperature of about 1300° C. to about 1500° C. and held there for about 1 to about 5 hours. The temperature may then be lowered at a rate of about 100° C. to about 300° C. per hour to room temperature.

After the electrolyte layer 18 has been deposited onto the inner electrode 14, an outer electrode layer 16 is formed by any suitable means, including but not restricted to EPDing electrode material onto the electrolyte 18, or dip-coating, brushing, spraying or sol-gel coating the electrolyte 18 in an electrode slurry (not shown). If the outer electrode 18 is to serve as the cathode, the slurry may suitably be composed of LSM (or a Mg-doped lanthanum manganate), binder, and solvent and combustible particles. The outer electrode composition may suitably be LSM, or a LSM/zirconia mixture, or another electrically and ionically conductive ceramic material.

Then, the outer electrode 16 is subjected to a drying stage wherein the electrode 16 is subjected to heat at increasing temperatures of 40° C., 60° C., 80° C., 100° C., 120° C., and 140° C. The outer electrode 16 may be heated at each temperature for a period between 10 minutes to 5 hours.

Then, a final sintering stage is applied to partially densify the outer electrode layer 16, to bond the outer electrode layer 16 to the electrolyte 18, and to combust any combustible particles in the outer electrode material. The sintering cycle where the sintering atmosphere is air may begin by raising the temperature from room temperature to a first temperature of about 200–250° C., then to a second temperature between about 400–600° C., then to a third temperature between about 800–900° C., then finally to a temperature of between 1100 to 1300° C. The heating rate for each of these sintering steps is between about 20–200° C./hr. The electrode is held at each of these temperatures for between about 15 minutes to 5 hours. The temperature may then be lowered at a rate of about 60–300° C. per hour to room temperature.

Various characteristics of the inner electrode and electrolyte can be controlled. For example, the inner electrode diameter can be selected by selecting a particular diameter of the core. The ductility of the inner electrode 14 can be controlled by controlling the amount of additives (generally, the greater the amount of second phase additives, the less ductile the electrode).

Porosity of the electrodes 14, 16 can be controlled by controlling the quantity and type of combustible particles added to the ceramic particle suspension. For example, combustible particles can include carbon black, carbon, graphite, different polymer powders and cellulose base powders. As a result of the addition, the combustible particles are co-deposited onto the conductive core during MED or CED. When the electrodes 14, 16 are heated during sintering, the combustible particles are burned off (along with the core), leaving a porous hollow structure.

The porosity can also be controlled by controlling the temperature and time of the sintering process. Long sintering times or sintering at higher temperatures or a combination of both can reduce porosity. Porosity can also be controlled by controlling the ceramic particle size distribution and its surface area. Finer and high surface area ceramic particles normally will have a lower porosity than coarse and low surface area powder when both of them are sintered under identical conditions. Porosity can also be controlled by sintering additives which are well known in the art, such as glassy or sol-get phase or any other liquid forming phases. The time and temperature parameters in a typical sintering cycle, may be varied by one skilled in the art to achieve a particular desired result.

According to another embodiment of the invention, a tubular SaFC 12 is produced according the steps in the above method along with an additional sintering step that occurs after the inner electrode 14 is deposited on the conductive core 32, but before the electrolyte 18 is deposited onto the inner electrode 14. In other words, a method of producing a tubular SaFC 12 is provided having three sintering cycles. In the first cycle, and after the inner electrode 14 is formed, the core bearing the inner electrode 14 is subjected to the first sintering cycle, wherein the temperature is raised from room temperature to about 500 C. at a heating rate of about 30–100° C./hr and held at that temperature for between about 10 minutes to 3 hours. Then the temperature is raised at a rate of about 60–200° C./hr to 900° C. then held at that temperature for between about 15 mm to 3 hours. Finally, the temperature is raised at a rate of between about 100–300° C./hr to 1100–1350° C. and held there for between about 1 to 5 hours. During this sintering stage, the combustible core and combustible particles (if any) combust, leaving behind a hollow (and porous if combustible particles in the electrode material are present) electrode structure. Then, the electrode is cooled at a rate of 100–300° C./hr to room temperature. Then, zirconia electrolyte is deposited onto the electrode by EPD or by vacuum casting, and the electrode/electrolyte structure is subjected to the second sintering cycle. In this cycle, the structure is heated from room temp to 900° C. at a rate of between about 60–200° C./hr, then without holding at that temperature to between about 1300–1500° C. (preferably at 1400° C.) at a rate of between about 200–300° C./hr and held at that temperature for between about 1–5 hours. Then, the structure is cooled at 300° C. per hour to room temperature. Then, ceramic material is applied onto the electrolyte 18 to form the outer electrode 16 by painting, dip coating etc. and the fuel cell structure is subjected to the third sintering cycle. In this cycle, the structure is heated from room temperature to a first temperature of about 200–250° C., then to a second temperature between about 400–600° C., then to a third temperature between about 800–900° C., then finally to a temperature of between 1000 to 1300° C. The heating rate for each of these sintering steps is between about 20–300° C./hr. The electrode is sintered at each of these temperatures for between about 15 minutes to 5 hours. The temperature may then be lowered at a rate of about 60–300° C. per hour to room temperature.

B. Producing a Stack or Sub-Stack of Fuel Cells

A plurality of fuel cells 12 can be assembled into a stack 10 or sub-stack 30 for use in a fuel cell system. To hold the fuel cells 12 in place, the fuel cells 12 are embedded in a relatively rigid but porous foam-like matrix 20 that serves as a support structure. If made with certain materials, the matrix 20 can also serve as part of the cathode 16, by collecting current and conducting oxygen (oxide) ions to the electrolyte 18.

There are different processes to embed fuel cells in the porous matrix. According to one process, and referring to FIG. 12, an apparatus 52 is provided for immersing a plurality of fuel cells 12 in a slurry of matrix material. The apparatus 52 comprises a pair of end plates 54 made of a ceramic, superalloy or another material capable of withstanding sintering, a combustible flexible sheet 56, and means for supplying the slurry to the container (not shown). The end plates 54 each have a plurality of indentations 58 on one of their major faces; the indentations 58 are shaped and sized to accept the ends of fuel cells 12. The flexible sheet 56 may be made of paper board or a suitable plastic material. Upon sintering (described below), the flexible sheet 56 burns away. Alternatively, the flexible sheet 56 may be replaced by a non-combustible container wall (not shown) of ceramic such as alumina or zirconia, or metal. Such container serves to contain the slurry during heat treatment/sintering, but can also serve as an integral component of the fuel cell stack 10.

Each end of each fuel cell 12 is taped with a protective masking tape (not shown) or a suitable combustible coating to keep the ends free from the slurry. Then, each end plate 54 is clamped to each end of each fuel cell 12, holding each fuel cell 12 in place. Then, the flexible sheet 56 is wrapped around the fuel cells 12; the sheet 56 is large enough to wrap completely around the fuel cells 12 and to attach to each end plate 54. When wrapped, the sheet 56 and end plates 54 form a cylindrical container that encloses the fuel cells 12. A slurry injection port 60 is provided in one of the base plates.

The slurry is a suspension of the matrix material, water or organic solvent, a dispersant, a foaming agent, organic monomers and an initiator. The matrix material in this case is LSM (lanthanum strontium manganate), but can be any ceramic and/or metal powder having suitable properties, such as $LaCr(Mg)0_3$, doped $LaCrO_3$ ($La y_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$), stainless steel (316, 316L), cermet (such as Ni-Yittra stabilized zirconia or any Ni and doped zirconia cermet, Ni doped—$CeO_2$ cermet, Cu doped-ceria cermet), silver and its alloys, Inconel steel or any super alloy, or ferritic steel SiC, $MoSi_2$. The organic monomers may be mehty methacrylate, butyl arcylate, acrylamide, or other acrylates. The dispersant may be polyacrylic acid. The foaming agents may be Tergiton TMN10 or Triton X114. The initiator may be ammonium persulphate (APS). The slurry upon heat treatment will produce a foam that has a porous structure wherein the majority of the pores are interconnected to provide continuous fluid pathways. Upon sintering, this foam becomes the solid-state porous matrix 20 with a foam-like microstructure.

Instead of or in addition to the foaming agent, combustible additives may be added to the slurry, such as polymer powder, organic powder, saw dust and fibres. Upon sintering at a temperature hot enough to combust the combustible additives, the additives burn away, leaving behind the solid-state matrix 20 with a foam-like porous microstructure.

The slurry is injected or poured through the slurry port 60 until the container is filled and the fuel cells 12 are immersed with slurry. The slurry is left to completely dry at ambient temperature (or at an elevated temperature up to about 120° C.).

After the slurry has dried, the container and its contents are sintered. The sintering cycle involves first increasing the temperature from ambient to 200° C. for and holding at that temperature 1–10 hours, then increasing the temperature to 500° C. and holding at that temperature for 1–10 hours, then increasing the temperature to 650° C. and holding at that temperature for 1–10 hours, then increasing the temperature to 900° C. and holding at that temperature for 1–10 hours, then finally increasing the temperature to 1000–1400° C. and holding at that temperature for 5 hours. The rate of temperature increase in each step is between 20–300° C. The temperature is then allowed to drop to ambient temperature at a rate of between 60–300° C.

During sintering, the combustible flexible sheet 56 is burned away, leaving behind a fuel cell stack 10 or sub-stack 30 having the fuel cells 12 embedded in the solidified porous matrix 20 such that the matrix surrounds the length of each embedded fuel cell (because the ends of the fuel cells are masked prior to coating with slurry, they are free of the matrix). The end plates 54 are then removed, and the stack 10 is ready for combining with other components to produce a fuel cell system, or the sub-stack 30 is ready for combining with other sub-stacks to form the stack 10.

According to a first alternative embodiment of the invention (not shown), the stack or sub-stack can be formed by first coating each fuel cell with slurry, then stacking the slurry-coated fuel cells onto a plate such that the slurry coat on each fuel cell contacts the slurry coat in adjacent fuel cells. The coating may be effected by dip-coating or spraying or other suitable known means. Combustible spacers may be placed between the fuel cells during stacking, to maintain a desired separation between fuel cells in the stack. The spacers may have different geometries depending on the desired geometrical configuration of the stack, e.g. hexagonal inserts will form a stack of fuel cells in a honeycomb-like configuration. Then, the stacked cells are allowed to dry, and sintered according to the sintering steps described above, such that a sub-stack having the fuel cells embedded in the porous matrix is formed. Upon sintering, the combustible spacers, if any, burn away. Alternatively, the spacers may be made from a non-combustible material such as metal; such spacers remain with the fuel cells after sintering, and in such case, are provided with channels therethrough to allow reactant to flow through the spacers.

According to a second alternative embodiment of the invention (not shown), the stack or sub-stack can be formed by first coating each fuel cell with slurry, then stacking the slurry-coated fuel cells onto a flexible sheet of paper, plastic or other suitably flexible material such that the slurry coat on each fuel cell contacts the slurry coat in adjacent fuel cells. Again, combustible spacers may be inserted between fuel cells. The flexible sheet can then be folded, bent, or otherwise manipulated into a desired shape of the sub-stack, e.g. the sheet can bent into a cylindrical or another desired shape to form a stack or sub-stack. The fuel cells, slurry, and sheet are then dried and sintered according to the steps described above. The sheet may be made of a combustible material that burns away upon sintering.

According to a third alternative embodiment of the invention (not shown), the stack or sub-stack can be formed by first pouring the slurry into a container, then inserting one or more combustible rods or other suitable elongate member into the slurry. The slurry and rods are then dried and sintered according to the steps described above, and the rods burn away, leaving behind a porous matrix with channels corresponding to the burned-away rods. Then, a fuel cell corresponding in shape and size to the channel is inserted into each channel. If the fuel cell is not securely embedded in the channel, additional slurry may be poured between the fuel cell and the channel, and an additional drying and sintering step can be carried out to solidify the slurry and fasten the fuel cell in place.

Any of the above methods of producing the sub-stack can optionally include a further step of inserting combustible rods, filaments, fibres, tows or other suitable elongate members into the slurry before it dries, so that channels in the matrix are formed when the slurry is dried and sintered at a temperature sufficient to solidify the slurry into the matrix, and to burn away the combustible inserts. These channels can be parallel, perpendicular, or in any other direction relative to the fuel cells.

According to a fourth alternative embodiment of the invention (not shown), the stack or sub-stack can be formed using a templated processing technique. This technique involves first inserting fuel cells into a suitable template material, such as a sponge, carbon felt, or graphite felt, such that the fuel cells are securely held in place. Then, the template material is impregnated with the slurry. Then, the slurry and fuel cell containing template is dried and sintered. During sintering, the template material will burn away, leaving behind a foam-like porous matrix.

If the fuel cells are too fragile to survive inserting directly into the template material, metal or plastic tubes (having an inside diameter at least as large as the outside diameter of the fuel cell) are first inserted into the template material, then the fuel cells are inserted into the tubes. The tubes are then withdrawn from the template material, leaving behind the embedded fuel cells. Alternatively, combustible tubes or rods may be inserted into the template material. The template is then impregnated with slurry and dried and sintered. Upon sintering, the combustible tubes/rods burn away, leaving behind channels that enable the fuel cells to be inserted into template material. If the fuel cells are not securely held inside these channels, additional slurry may be added, that upon drying and sintering will secure the fuel cells in place.

The template may be a non-combustible material such as an electrically conductive metal felt. The metal felt may be impregnated with a slurry that is ionically conductive and/or catalytic, to enhance the performance of the stack. In this case, a bonding slurry can be added between the felt and the fuel cells embedded in the felt. Upon heat treating, the bonding slurry will secure the fuel cells to the metal felt and improve the electrical conductivity between the felt and the fuel cell. The bonding slurry may be composed of cathode material, or the same metal as the felt. As an alternative to or in addition to adding bonding slurry, the fuel cell embedded felt may be placed inside a thermally and electrically insulating container and compressed by the container until a suitable contact is established between the felt and the fuel cells.

Non Fuel Cell Applications

It is to be understood that the invention is not limited to fuel cell stacks, but is applicable to non fuel cell applications. In particular, the invention is useful in fluid separation and/or membrane reactor applications.

Fluid Separation

Tubular HIMs can be used to selectively separate contents from a fluid stream. Such applications include fresh water treatment, waste water treatment, waste oil treatment, gas separation, and biotechnology/pharmaceutical-related purification and concentration applications.

In fluid separation applications, there is no chemical reaction, and as such, no catalytic material is required. HIM for this application are herein referred to as a "tubular fluid separation membrane" (not shown). A group of fluid separation membranes can be stacked together to form a fluid separation membrane module (not shown). In a module, each tubular membrane has a support layer and separation layer. The module may be suitable for water treatment applications. In such case, the separation layer is relatively thin, having a wall thickness in the range of about 0.5 $\mu$m to 30 $\mu$m. The average pore size in the separation layer has a pore size $\leq$0.3 $\mu$m. The support layer has an average pore size $\geq$0.3 $\mu$m. The support layer of each tube may be manufactured by EPD as described above. The separation layer may be manufactured by sol-gel techniques as known in the art. The support layer composition may comprise for example, $Al_2O_3$, zirconia, $Al_2O_3$—zirconia composites, clay, or $TiO_2$. The separation layer may comprise for example, $Al_2O_3$, zirconia, $Al_2O_3$—zirconia composites or $TiO_2$.

These tubes are embedded in a porous matrix that may have a foam-like microstructure. The porous matrix may be manufactured according to the methods described above. The matrix composition may comprise for example $Al_2O_3$, zirconia, $Al_2O_3$—zirconia composites, or steel. The matrix provides a support structure for the tubular membranes in the module, and is porous enough to allow the flow-through of liquid. The matrix may be coated with chemicals suitable for the separation desired. For example, the matrix may be coated with $TiO_2$-photo-catalyst to decompose hydrocarbons and micro-organisms and kill water borne bacteria in the presence of UV light.

In operation, unpurified water is processed by the module by flowing through the inside of each of the tubular membranes. If the separation layer is on the outside of the support layer, the support layer serves to filter out any particles $\geq$0.3 $\mu$m, and the separation layer serves to filter out any particles $\leq$0.3 $\mu$m. The purified water passes through the tubular membranes and into the matrix, wherein it is flowed out of the module for collection. Alternatively, the unpurified water may be flowed through the matrix and to each tubular membrane, in which the purified water is flowed out of the module via the inside of each tubular membrane.

Membrane Reactors

The coupling of separation and reaction on an inorganic membrane, stable at the temperatures of catalytic processes, could in principle provide higher pre-pass conversions for equilibrium limited reactions, (e.g. dehydrogenations), higher selectives for intermediate products of consecutive reaction pathways (e.g. partial oxidations), and various other applications. A membrane reactor is a multifunctional apparatus wherein the membrane is used to affect either the conversion or selectivity of one or more chemical reactions, in general, catalytically promoted reactions, and be capable of separating some components of a mixture by selective permeation.

Tubular HIMs (not shown) can be provided as membrane reactors (and thus be referred to here as "tubular membrane reactors") and be used in such applications such as gas separation. In this application the tubular membrane reactors can be stacked together into a membrane reactor module (not shown). Each tubular membrane reactor has two layers, namely, a support layer made of ceramics, e.g. $Al_2O_3$, zirconia, clay and a functional layer made of Pd or Pd-alloy (e.g. Pd—Ag). The support layer can be formed by the EPD method as described above.

Each tubular membrane reactor is embedded in a porous matrix that may have a foam-like microstructure. The embedding and forming of the matrix may be according to the methods described above. The matrix composition may comprise for example $Al_2O_3$, zirconia, $Al_2O_3$—zirconia composites, or steel. The matrix provides a support structure for the tubular membranes in the module, and is porous enough to allow the flow-through of liquid.

Preferably, the functional layer is inside the support layer to avoid any reaction between the reaction layer materials and the matrix materials; however, if suitable materials are selected, the functional layer may be on the outside of the support layer. Also preferably, the functional layer is formed on the inside of the support layer after the support layer has been embedded in the matrix and sintered, to avoid any high temperature treatment that may damage the Pd coating. The functional layer may be deposited on the inside of the support layer by an electroless plating method as described above.

The completed membrane reactor module may be used for hydrogen gas separation applications since hydrogen gas is diffusible through the Pd or Pd-alloy. The Pd or Pd-alloy functional membrane layer is kept thin (0.5 $\mu$m to 10 $\mu$m) to minimize costs and reduce hydrogen diffusion time; the support layer acts as a support substrate for the functional membrane. In operation, the hydrogen gas is separated from the source fluid fed through the inside of each tubular membrane reactor, and is permeated through each reactor and into the matrix. The porosity of the matrix is selected to enable the hydrogen gas to be transmitted through the matrix and out of the module for collection.

Alternatively, the membrane reactors may be provided with a porous Pd or Pd-alloy metal (or cermet), Pt or Pt-alloy metal inner membrane and a dense ceramic outer electrolyte membrane that is a non-porous ionic or mixed conductor, and an outer membrane layer. In this embodiment, the metal inner membrane serves as an electrode and catalyst. The outer layer also serves as an electrode. The properties of the electrolyte are selected so that the electrolyte is impermeable to certain gases, but will allow certain ions to pass therethrough. For example, if the ceramic is made from stabilized zirconia, the membrane reactor can separate oxygen from air by separating oxygen molecules into electrons and oxygen ions at the inner membrane upon application of electric current from an external DC source, then pass the oxygen ions through the electrolyte, for recombining with the electrons that have traveled from the inner membrane to the outside surface of the electrolyte through an external circuit.

While the preferred embodiment of the invention has been illustrated and described, it will be appreciated that various changes can be made therein without departing from the scope and spirit of the invention.

What is claimed is:

1. A fuel stack comprising
   (a) a plurality of tubular fuel cells, each fuel cell comprising an inner electrode layer, an outer electrode layer, and an electrolyte layer sandwiched between the inner and outer electrode layers; and,
   (b) a solid-state electronic or mixed (electronic and ionic) conductive, porous matrix in which the fuel cells are embedded,
   wherein a first reactant is flowable through the matrix and to the outer electrode layer of at least one of the fuel cells, and a second reactant is flowable through the inside of at least one of the fuel cells and to the inner electrode thereof.

2. The fuel cell stack of claim 1 wherein the matrix has a foam microstructure.

3. The fuel cell stack of claim 2 wherein the matrix has a porosity of between 40 and 95%.

4. The fuel cell stack of claim 3 wherein the matrix has a porosity of about 60%.

5. The fuel cell stack of claim 3 wherein the inner electrode layer is an anode and the outer electrode layer is a cathode, and the first reactant is oxidant and the second reactant is fuel.

6. The fuel stack of claim 3, wherein the inner electrode layer is a cathode and the outer electrode layer is an anode, and the first reactant is fuel and the second reactant is oxidant.

7. The fuel cell stack of claim 5 wherein the fuel cells are of a solid-oxide type and the matrix composition includes an electronic or mixed (ionic and electronic) conductive ceramic, metal or cermet material.

8. The fuel cell stack of claim 7 wherein the matrix material is lanthanum strontium manganate.

9. The fuel cell stack of claim 7 wherein the matrix material is doped $LaCrO_3$.

10. The fuel cell stack of claim 7 wherein the diameter of at least one of the fuel cells is in the range of about 10 $\mu$m to 2000 $\mu$m.

11. The fuel cell stack of claim 10 wherein the inner electrode layer of at least one the fuel cells is produced by a process selected from the group consisting of electrophoretic deposition, metal electrodeposition, and composite electrodeposition.

12. A method of producing a fuel cell stack comprising:
   (a) producing a plurality of tubular fuel cells, each fuel cell having an inner electrode layer, an outer electrode layer, and an electrolyte layer sandwiched between the inner and outer electrode layers;
   (b) coating the fuel cells with a slurry having a composition that includes a matrix material that upon sintering, becomes a solid-state electronic or mixed (electronic and ionic) conductive porous matrix;
   (c) stacking the fuel cells such that the slurry coating of each fuel cell is in contact with the slurry coating of adjacent fuel cells; and
   (d) sintering the coated and stacked fuel cells to solidify the matrix and embed the fuel cells therein,
   thereby producing a stack wherein a first reactant is flowable through the matrix and to the outer electrodes layer of at least one of the fuel cells, and a second reactant is flowable through the inside of at least one of the fuel cells and to the inner electrode thereof.

13. The method of claim 12 wherein the step of producing the fuel cell comprises first forming an inner electrode layer on a combustible deposition cathode by a process selected from the group consisting of electrophoretic deposition, metal electrodeposition, and composite electrodeposition, then forming an electrolyte layer on the inner electrode layer by electrophoretic deposition, then forming an outer electrode layer onto the electrolyte layer, and then applying a sintering step that combusts the deposition cathode.

14. The method of claim 13 wherein the matrix material in the slurry is selected from the group consisting of lanthanum strontium manganate, $LaCr(Mg)O_3$, doped $LaCrO_3$, $La_{1-x}Sr_xCrO_3$, $La_{1-x}Ca_xCrO_3$, $La_{1-x}Mg_xCrO_3$, $LaCr(Mg)O_3$, stainless steel 316, stainless steel 316L, cermet silver and its alloys, Inconel steel, any super alloy, ferritic steel, SiC, and $MoSi_2$.

15. The method of claim 13 wherein the slurry further includes a foaming agent, such that upon a selected heat treatment, a solid-state porous matrix is formed having a foam microstructure.

16. The method of claim 13 wherein the slurry further includes combustible particles, such that upon a selected heat treatment, a solid-state porous matrix is formed having a porous microstructure.

17. The method of claim 13 wherein the steps of coating the fuel cells with slurry and stacking the fuel cells comprise stacking the fuel cells in a container, then adding the slurry into the container such that the fuel cells in the container are immersed in the slurry.

18. The method of claim 13 wherein the steps of coating the fuel cells with slurry and stacking the fuel cells comprise coating each fuel cell then placing combustible spacers between the fuel cells before stacking.

19. The method of claim 13 wherein the steps of coating the fuel cells with slurry and stacking the fuel cells comprise coating the fuel cells then placing the coated fuel cells on a flexible sheet, then manipulating the sheet such that the fuel cells are arranged into a desired stack configuration.

20. A method of producing a fuel cell stack comprising:
   (a) producing a plurality of tubular fuel cells, each fuel cell having an inner electrode layer, an outer electrode layer, and an electrolyte layer sandwiched between the inner and outer electrode layers;
   (b) providing a container of combustible members in a desired stack configuration and immersed in a slurry having a composition that includes a matrix material that upon sintering, becomes a solid-state electronic or mixed (electronic and ionic) conductive porous matrix;
   (c) sintering the slurry and combustible members such that the matrix is formed and the combustible members combust, thereby producing a plurality of channels in the matrix; and,
   (d) inserting at least one fuel cell into at least one channel;
   thereby producing a stack wherein a first reactant is flowable through the matrix and to the outer electrode layer of at least one of the fuel cells, and a second reactant is flowable through the inside of at least one of the fuel cells and to the inner electrode thereof.

21. The method of claim 20 further comprising for at least one fuel cell, (e) adding slurry into the channel between the fuel cell and the matrix, then sintering the slurry such that the fuel cell is securely embedded in the matrix.

22. A method of producing a fuel cell stack comprising:
   (a) producing a plurality of tubular fuel cells, each fuel cell having an inner electrode layer, an outer electrode layer, and an electrolyte layer sandwiched between the inner and outer electrode layers;
   (b) embedding the fuel cells in a combustible template material;
   (c) impregnating the template material with a slurry having a composition that includes a matrix material that upon sintering, becomes a solid-state electronic or mixed (electronic and ionic) conductive porous matrix; and
   (d) sintering the impregnated and fuel cell embedded template material such that the template material combusts, and the matrix is formed;
   thereby producing a stack wherein a first reactant is flowable through the matrix and to the outer electrode layer of at least one of the fuel cells, and a second reactant is flowable through the inside of at least one of the fuel cells and to the inner electrode thereof.

23. The method of claim 22 wherein the template material is selected from the group consisting of a sponge, carbon felt, and graphite felt.

24. A fluid separation apparatus comprising
   (a) a plurality of tubular fluid separation membrane assemblies, each assembly comprising a porous separation layer and a porous support layer in adjacent contract with the separation layer, wherein the porosity of the separation layer is selected according to the fluids to be separated; and,
   (b) a solid-state porous matrix in which the assemblies are embedded,
   wherein an unseparated fluid is flowable through one of the matrix or the inside of at least one of the assemblies, and a separated fluid separated from the unseparated fluid by the separation layer is flowable through the other of the matrix and the inside of at least one of the assemblies.

25. The fluid separation apparatus of claim 24 wherein the separation layer has a thickness of between about 0.5 to 30 $\mu$m.

26. The fluid separation apparatus of claim 25 wherein the porosity of the separation layer is less than or equal to 0.3 $\mu$m.

27. The fluid separation apparatus of claim 25 wherein the porosity of the support layer is greater than or equal to 0.3 $\mu$m.

28. The fluid separation apparatus of claim 27 wherein the support layer composition includes one or more material(s) selected from the group consisting of $Al_2O_3$, zirconia, $Al_2O_3$—zirconia composites, clay and $TiO_2$.

29. The fluid separation apparatus of claim 28 wherein the separation layer composition includes one or more material (s) selected from the group consisting of $Al_2O_3$, zirconia, $Al_2O_3$—zirconia composites and $TiO_2$.

30. The fluid separation apparatus of claim 24 wherein the matrix has a foam microstructure.

31. The fluid separation apparatus of claim 30 wherein the matrix composition includes one or more material(s) selected from the group consisting of $Al_2O_3$, zirconia, $Al_2O_3$—zirconia composites and steel.

32. The fluid separation apparatus of claim 31 wherein the matrix is coated with $TiO_2$ photo catalyst.

33. The fluid separation apparatus of claim 24 wherein the separation layer is a membrane reactor and has a composition that includes material that affects the conversion or selectivity of one or more chemical reactions of the fluids flowable through the apparatus.

34. The fluid separation apparatus of claim 33 wherein the membrane reactor layer has a composition that includes Pd.

35. The fluid separation apparatus of claim 34 wherein the membrane reactor layer has a thickness of between about 0.5 and 10 $\mu$m.

* * * * *

UNITED STATES PATENT AND TRADEMARK OFFICE
CERTIFICATE OF CORRECTION

PATENT NO. : 6,824,907 B2
DATED : November 30, 2004
INVENTOR(S) : Partho Sarkar and Hongsang Rho It is certified that error appears in the above-identified patent and that said Letters Patent is hereby corrected as shown below:

<u>Title page,</u>
Item [73], Assignee, should be -- Alberta Research Council, Inc. --

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,824,907 B2  
DATED : November 30, 2004  
INVENTOR(S) : Partho Sarkar and Hongsang Rho It is certified that error appears in the above-identified patent and that said Letters Patent is hereby corrected as shown below:

Column 12,
Line 39, delete "15mm" and insert -- 15min --, therefor.

Column 13,
Line 59, delete "bum" and insert -- burn --, therefor.

Column 18,
Line 38, delete "electrodes" and insert -- electrode --, therefor.

Signed and Sealed this

Thirteenth Day of September, 2005

JON W. DUDAS
*Director of the United States Patent and Trademark Office*